United States Patent [19]

Nishikawa et al.

[11] 4,164,298
[45] Aug. 14, 1979

[54] FROSTED BOTTLE OF SATURATED POLYESTER

[75] Inventors: Masanori Nishikawa, Tochigi; Masao Hattori, Hatano, both of Japan

[73] Assignee: Yoshino Kogyosho Co., Ltd., Tokyo, Japan

[21] Appl. No.: 779,473

[22] Filed: Mar. 21, 1977

[30] Foreign Application Priority Data

Mar. 31, 1976 [JP] Japan ................................. 51/36636

[51] Int. Cl.$^2$ ...................... B65D 23/00; B29C 17/07; B29B 3/00

[52] U.S. Cl. .................................... 215/1 C; 264/521; 426/106; 428/35; 264/535

[58] Field of Search ............... 215/1 C; 428/212, 480, 428/482, 35; 264/89, 97, 98, 94, 327; 426/106

[56] References Cited

U.S. PATENT DOCUMENTS

| | | | |
|---|---|---|---|
| 3,745,150 | 7/1973 | Corsover | 215/1 C |
| 3,814,785 | 6/1974 | Reade | 264/89 |
| 3,821,343 | 6/1974 | Sudo | 264/89 |
| 3,822,332 | 7/1974 | Hrach et al. | 264/97 |
| 3,849,530 | 11/1974 | Wyeth et al. | 264/89 |
| 4,036,927 | 7/1977 | Stolki | 264/89 X |
| 4,039,641 | 8/1977 | Collins | 264/89 X |
| 4,042,657 | 8/1977 | Ostapchenko | 264/89 X |
| 4,044,086 | 8/1977 | McChesney et al. | 264/97 |

Primary Examiner—Steven L. Weinstein

[57] ABSTRACT

One of the main objectives of the present invention is to provide a frosted bottle made of a saturated polyester.

The bottle according to the present invention is made from a cylindrical material prepared by injection molding and has a bottom wall and a transparent upper portion in the vicinity of the opening thereof. The peripheral outer surface of the cylindrical material is heated to allow the outer surface to become milky white, and is then put into a mold for blow molding to inflate the trunk and bottom walls other than the neck portion thereby for forming a bottle. The bottles according to the present invention are, therefore, characterized by having walls which are composed of inner transparent portions and opaque outer peripheral portions of milky white color, when viewed in cross section.

3 Claims, 6 Drawing Figures

FROSTED BOTTLE OF SATURATED POLYESTER

BACKGROUND OF THE INVENTION

It is sometimes desirous to color bottles or to make them translucent or opaque in order to improve their appearances. Conventionally known methods of making such translucent or opaque bottles, i.e. frosted bottles, of synthetic resins are to use a mould having a roughened inner surface provided with numerous minute scars or scratches, or to corrode the surface of a transparent bottle. However, the bottles made by any of the conventional methods described above have disadvantages in that minute projections and recesses are formed on the surfaces thereof, similar to ground glass, to become unpleasant to the touch, and that they may be easily soiled due to adhesion of dusts and oily material transferred from the hands into the recesses or on the projections, and that the appearances thereof are spoiled since luster of the surfaces has been lost. Moreover, said roughened mould is expensive since complicated operations are required to manufacture the same, which results in increase in production cost of the moulded bottle.

SUMMARY OF THE INVENTION

The present invention is made by making use of the fact that saturated polyester resins are caused to be crystallized below the temperature range of crystallization temperature ($T_{cc}$) and higher than the glass transition temperature ($T_g$), if specific interrelation is established between the temperature and time, for making bottles.

The primary object of the present invention is, therefore, to produce a frosted bottle at low cost.

A further object of the invention is to make it possible to produce bottles of different degrees of opacity as desired.

Another object of the invention is to make it easy to produce a bottle which has a transparent upper portion forming the neck portion thereof and a frosted lower portion of generally milky white color except where the molten material is intentionally colored.

Yet a further object of the present invention is to provide a frosted bottle having improved dimensional and thermal stabilities by producing it by biaxial orientation characterized in that the trunk and bottom portions are expanded two-dimensionally. Other objects and advantages of the present invention will be apparent from the detailed description of the invention.

DETAILED DESCRIPTION OF THE INVENTION

Figure 1:
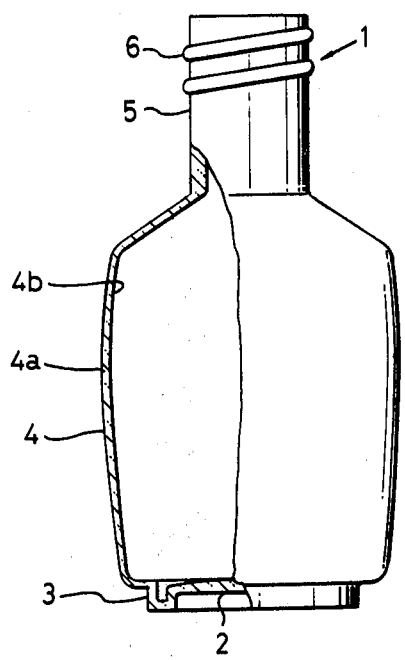
FIG. 1 is a front view of a bottle of an saturated polyester resin made in accordance with the present invention with portions broken away.
Figure 2:
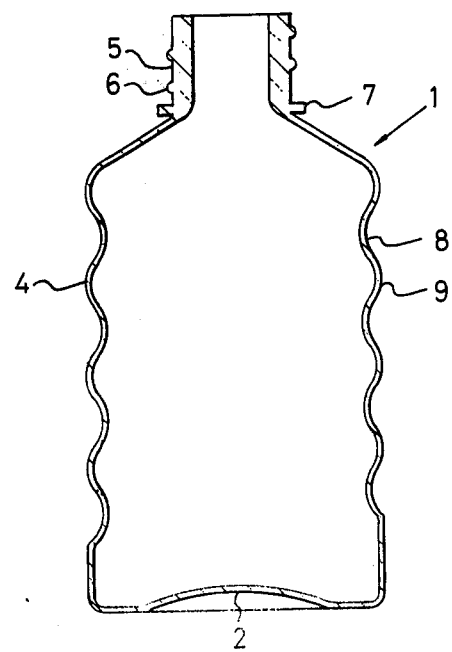
FIG. 2 is a cross sectional view of another embodiment.
Figure 3:
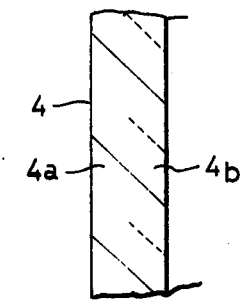
FIG. 3 is an enlarged view showing the trunk portion of the bottle.

In the drawings, reference numeral 1 shows a bottle of an saturated polyester resin made in accordance with the present invention and having a bottom wall 2, an annular leg 3 protruding downwardly from the under surface of the bottom wall 2, a trunk portion 4, and a neck portion 5 provided with a threaded portion 6 for meshing with a cap. As shown in FIG. 2, an outwardly protruding flange 7 may be disposed on the base of the neck portion 5 for engaging with the lower edge of the cap. In order to increase the stiffness of the trunk portion 4 when the thickness of the trunk wall is extremely thin, a plurality of concave and projecting stripes 8 and 9 may be alternatively provided on the peripheral surface of the trunk portion. In general, the overall outer surface of the bottle 1 is frosted or made to have a ground glass like condition, whereas the other portions, i.e. the portions internally of the outer surface are transparent. However, the outer surface of the neck portion may be transparent, if desired, and the transparent area may be extended such that the upper half of the trunk portion may be transparent.

The bottle having the construction as described above may be moulded in the following manner. Firstly, a transparent cylindrical material 11 commonly known as a "parison" which has a bottom wall and a top opening and made of an saturated polyester resin is prepared by injection moulding. In the process of preparing the cylindrical material, it is required to suddenly cool the material to room temperature at a cooling speed high enough to avoid occurrence of crystallization, since crystallization occurs if it is cooled too slowly from the moulding temperature after it is moulded. The cooling speeds commonly employed in general injection moulding operations are well suited for the sudden cooling speed mentioned above. The portion of the material corresponding to the neck portion 15 is not necessarily expanded by biaxial orientation as the portions corresponding to the trunk 14 and the bottom wall 12, but it is only required to be provided with the threaded portion 6 and the outwardly protruding flange 7 for forming the neck portion of the bottle, if desired.

Figure 5:
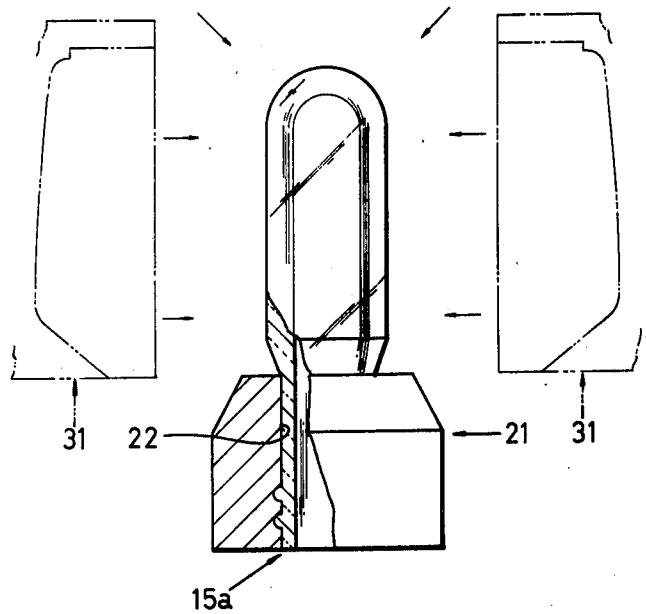
FIG. 5 is a front view of the cylindrical material fitted to a support member with portions broken away.
Figure 4:
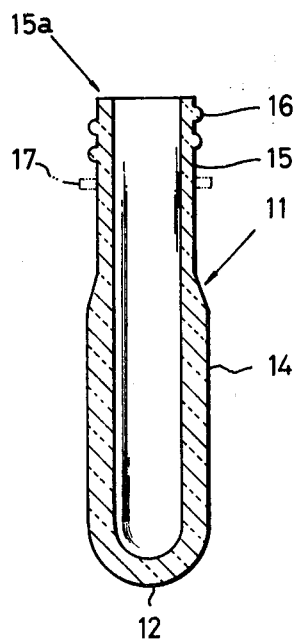
FIG. 4 is a cross sectional view of a cylindrical material which is used as the intermediate product for forming the bottle of the invention.
Figure 6:
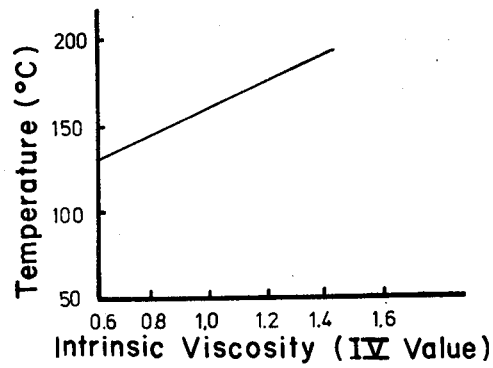
FIG. 6 is a graph showing the crystallization phenomenon of an saturated polyester resin in terms of the temperature and the intrinsic viscosity (IV value).

The overall outer surfaces of the cylindrical material or the outer surfaces of the trunk and bottom walls thereof, as shown in FIG. 5, by inserting the port portion 15a into an insertion hole 22 of a suitable support member 21, are heated from the outside to a temperature in the range of higher than the glass transition temperature ($T_g$) of the material and lower than the crystallization temperature ($T_{cc}$) by means of a heat source such as a heater. Saturated polyester resins are crystallized produce a milky white color if they are heated at a temperature higher than $T_g$ under the conditions at which specific interrelations are established between the temperature and time. In view of this fact, the material used is heated to a temperature at which the outer surface is crystallized and the internal portion thereof is not yet crystallized but can be inflated or expanded by biaxial orientation. The values of $T_g$, in general, of the saturated polyesters are about 70° C., and the values of $T_{cc}$ are varied depending on the intrinsic viscosities (IV values) of the individual materials and may be diagramatically shown by the exemplary temperature graph in FIG. 6. Consequently, it is theoretically possible to practise the present invention at any temperature included in the defined temperature range. However, it is preferable to heat the material at a temperature close to $T_{cc}$ for allowing it to be crystallized for a short period of time thereby for improving production efficiency, and heat treatment at a temperature close to $T_g$ is thus inconvenient since a prolonged time period is required for causing the crystallization phenomenon.

According to our empirical studies, advantageous results were obtained both in case where a cylinrical material having a trunk wall of 2.8 mm thickness on an IV value of 0.65 was heated to provide an outer surface temperature of 130° C. for 90 sec., and in the case where a cylindrical material having a trunk wall of 6 mm thickness and an IV value of 1.5 was heated to provide an outer surface temperature of 200° C. for 162 sec.

If the heating time is too long, the crystallization starting from the outer surface extends onto the inner surface for crystallizing the whole body, so that the material is deprived of its elasticity and becomes unable to form a bottle by blow moulding. Preferably, the crystallization is extended onto substantially the middle portion in the direction traversing the wall. Inflatability or ductility of the material is lowered, as the volume of the portion not crystallized decreases.

The material heated to reach the state mentioned immediately before is then transferred into a mould 31 for blow moulding, and the mould is clamped, and thereafter blowing is effected to form the bottle 1. The cylindrical material having the crystallized outer surface is expanded two-dimensionally while keeping the condition of the wall just as it is, whereby a frosted bottle having a crystallized outer surface is produced.

A bottle having the crystallized outer surface in its entirety may be formed by the process comprising the steps of crystallizing the overall outer surface of a cylindrical material by supporting it by the use of a support member which does not cover the outer peripheral surface of the neck portion, for instance by inserting a support member into the neck portion; and moulding the thusly crystallized material by blow moulding operation. On the other hand, a transparent neck portion may be formed if the portion corresponding to the neck portion is inserted into a support member 21 as shown in FIG. 5 to be covered with the support member and to be shielded from heat in the heating step before the blow moulding operation. In the outer surface of the interface region between the crystallized portion at the trunk side and the transparent neck portion, the opaque color is gradually gradated to be transparent, such gradation being due to the conducted heat.

In general, only the neck portion which is inserted into a support member and not caused to be crystallized is transparent. However, the transparent region may be extended, for instance, by attaching a heat shielding plate to the support member. It is possible to form a bottle having a transparent neck portion and a trunk portion the upper half of which is transparent and the lower half of which is gradated in color. Further, the degree of gradation may be lighter or deeper depending upon the degree of crystallization which may be varied by adjusting the interrelationship between the heating temperature, the heating time and the IV value.

What is claimed is:

1. A blow-molded bottle of saturated polyester resin having a bottom wall, a trunk portion, and a neck portion, wherein at least a part of the trunk portion has a cross section which exhibits a gradual change from a crystallized opaque state at the exterior surface to a transparent state at the inner surface obtained by a process which comprises the steps of, providing a parison of saturated polyester resin for blow-molding into said bottle, heat-treating from the outside that portion of said parison from which at least a part of said trunk portion is to be formed, to a predetermined temperature above the glass transition temperature and below the crystallization temperature, maintaining said heat-treating step for a predetermined period of time to provide on said part of said trunk portion a gradual change of said structural state, in cross section, from a crystallized state at the exterior surface to a transparent uncrystallized state at the inner surface which can be inflated or expanded by biaxial orientation and so that the parison maintains its elasticity to be able to form a bottle by blow moulding, and blow-molding said heat-treated parison into a bottle having a bottom wall, a trunk portion with an opaque exterior on at least a part thereof and a neck portion.

2. A bottle in accordance with claim 1 wherein:

said neck portion has a small diameter relative to the dimensions of the trunk portion; and said neck portion is transparent and void of crystallization.

3. A bottle in accordance with claim 2, wherein:

a part of said trunk portion adjacent said neck portion is void of crystallization; and the exterior surface of said trunk portion between said crystallized part of said trunk portion and said neck portion has a gradual change of structural state, along said exterior surface, from a crystallized state adjacent said crystallized part of said trunk portion to a transparent state adjacent said neck portion.

* * * * *